United States Patent
Rached et al.

(10) Patent No.: US 11,417,929 B2
(45) Date of Patent: Aug. 16, 2022

(54) BATTERY COMPARTMENT

(71) Applicant: Arkema France, Colombes (FR)

(72) Inventors: Wissam Rached, Chaponost (FR); Nicolas Dufaure, Bernay (FR)

(73) Assignee: ARKEMA FRANCE, Colombes (FR)

( * ) Notice: Subject to any disclaimer, the term of this patent is extended or adjusted under 35 U.S.C. 154(b) by 84 days.

(21) Appl. No.: 16/652,560

(22) PCT Filed: Oct. 1, 2018

(86) PCT No.: PCT/EP2018/076569
§ 371 (c)(1),
(2) Date: Mar. 31, 2020

(87) PCT Pub. No.: WO2019/068599
PCT Pub. Date: Apr. 11, 2019

(65) Prior Publication Data
US 2020/0243820 A1 Jul. 30, 2020

(30) Foreign Application Priority Data
Oct. 2, 2017 (FR) ...................................... 1759179

(51) Int. Cl.
*H01M 50/24* (2021.01)
*H01M 50/20* (2021.01)

(52) U.S. Cl.
CPC ........... *H01M 50/24* (2021.01); *H01M 50/20* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 2,705,227 A | 3/1955 | Stoeff | |
| 8,178,230 B2 | 5/2012 | Zhu et al. | |
| 2008/0274355 A1 | 11/2008 | Hewel | |
| 2013/0115401 A1* | 5/2013 | Doshi | C08L 29/04 428/36.9 |
| 2013/0266837 A1* | 10/2013 | Lee | B29C 45/14819 429/120 |
| 2014/0154535 A1* | 6/2014 | Olsson | H01M 50/394 429/53 |
| 2015/0086738 A1* | 3/2015 | Nitsche | C08K 5/005 428/36.91 |
| 2016/0126535 A1* | 5/2016 | Qiao | H01M 10/0481 429/61 |
| 2016/0248061 A1* | 8/2016 | Brambrink | C08L 51/085 |

FOREIGN PATENT DOCUMENTS

| | | | |
|---|---|---|---|
| EP | 0342066 A1 | | 11/1989 |
| EP | 0471566 A1 | | 2/1992 |
| EP | 1988113 | * | 11/2008 |
| EP | 2325260 | * | 5/2011 |
| JP | 2010-202724 | * | 9/2010 |
| WO | WO 2005/018891 | * | 3/2005 |
| WO | WO 2013/0115401 | * | 8/2012 |
| WO | 2013045426 A1 | | 4/2013 |

OTHER PUBLICATIONS

Machine translation of EP 1988113 (Year: 2008).*
Machine translation of EP 2325260 (Year: 2011).*
Machine translation of JP 2010-202724 (Year: 2010).*
Choi, et al. "Development of Polymer Composite Battery Pack Case for an Electric Vehicle", SAE International, published Apr. 8, 2013, 8 pages.
International Search Report (PCT/ISA/210) dated Nov. 26, 2018, by the European Patent Office as the International Searching Authority for International Application No. PCT/EP2018/076569.
Kirk-Othmer, "Cycloaliphatic Amines", Encyclopedia of Chemical Technology, 4th Edition, 1992, pp. 386-405.

* cited by examiner

*Primary Examiner* — Wyatt P McConnell
(74) *Attorney, Agent, or Firm* — Buchanan Ingersoll & Rooney P.C.

(57) ABSTRACT

The Invention Relates To A Battery Compartment For An Electric Or Hybrid Vehicle, Characterised In That It Consists Of A Composition Comprising: —20 To 80 Wt % Of Reinforcement Fibres Relative To The Total Weight Of The Composition; —0 To 20 Wt % Of At Least One Impact Modifier Relative To The Total Weight Of The Composition; —0 To 20 Wt % Of Additives Relative To The Total Weight Of The Composition; —The Remainder Being A Matrix Comprising: —Mainly At Least One Polyamide And—At Least One Flame Retardant.

16 Claims, No Drawings

BATTERY COMPARTMENT

The present invention relates to the field of electric or hybrid type automotive vehicles requiring the use of electric batteries.

In particular, the present invention relates to a battery compartment for an electric or hybrid automotive vehicle.

An "electric automotive vehicle" is understood to mean a vehicle as defined in United Nations Regulation No. 100 concerning the approval of electric battery type vehicles.

One of the goals sought in the automotive field is to propose less polluting vehicles. Thus, electric or hybrid vehicles comprising a battery aim to progressively replace combustion engine vehicles such as either gas or diesel vehicles.

It has turned out that the battery is a relatively complex vehicle component. It is necessary that the operating temperature thereof not exceed 55° C., otherwise some battery cells can break down and thus reduce the life thereof. It is also important to avoid any risk of flames. Further, depending on the positioning of the battery in the vehicle, it can be necessary to protect it from impact and from the outside environment, which can have extreme temperatures and variable humidity.

Thus, it is known to protect the battery in a compartment. Today, batteries are equipped with a metal compartment.

This compartment has the disadvantage of being relatively heavy and breaking down relatively quickly over time, in particular if it is located in a humid environment.

Thus, materials which satisfy the specific specifications mentioned above are sought to replace the known metal structures.

The goal is reached with a battery compartment for electric or hybrid vehicle characterized in that it is made up of a composition comprising:
- 20 to 80% by weight relative to the total weight of the composition of reinforcing fibers;
- 0 to 20% by weight relative to the total weight of the composition of at least one impact modifier;
- 0 to 20% by weight relative to the total weight of the composition of additives.
- where the remainder is a matrix comprising:
  - mostly at least one polyamide and
  - at least one flame retardant.

The battery compartment according to the invention has the advantage of being lighter than a metal structure. This weight savings contributes to the impact on the desired energy or fuel efficiency for vehicles described as clean.

Depending on the placement thereof in the vehicle, this compartment can be found in contact with an aggressive environment: high temperature in summer, low temperature in winter, contact with zinc chloride, impacts, high humidity. It was observed that the compartment according to the invention has a satisfactory resistance to these external stresses.

Further, required inflammability criteria can be met by the presence of flame retardants.

Further, it was observed, that according to the automotive manufacturers, the shape of the batteries could be varied. In fact, the manufacturers seek to house this battery in spaces unused or relatively unusable until now. The shaping of a plastic by molding or injection is easier to do than that of a metal plate.

Other characteristics, features, subjects and benefits of the present invention will appear even more clearly after reading the description and examples that follow.

It is indicated that the expression "included between" used in the preceding paragraphs, but also in the remainder of the present description, must be understood as including each of the terminals indicated.

In the meaning of the present invention, "battery compartment" is understood to mean an enclosure or box which is placed around the battery. The compartment according to the invention is not constituent part of the battery. The function of the compartment is to protect the battery.

Polyamide

The compartment according to the invention is made up of a composition comprising a matrix comprising at least one polyamide.

According to the present invention, the term "polyamide," also written PA, covers:
- homopolymers;
- copolymers, or copolyamides, based on different amide units, such as, for example, the 6/12 copolyamide with amide units derived from lactam-6 and lactam-12.

Generally, polyamides comprise at least two identical or different repeating units, where these units are formed from two corresponding monomers, or comonomers. The polyamides are therefore prepared from two or more monomers, or comonomers, chosen among an amino acid, a lactam and/or a carboxylic diacid and a diamine.

The polyamide according to the invention can be a homopolyamide and comprise at least two identical repeating units obtained by polycondensation of monomers chosen among an amino acid, a lactam and a unit satisfying the formula (Ca diamine)·(Cb diacid), with a representing the number of carbons in the diamine and b representing the number of carbons in the diacid, where a and b are each included between 4 and 36, such as defined below.

The polyamide according to the invention can also be a copolyamide and comprise at least two distinct repeating units, where these units can be obtained by polycondensation of monomers chosen among an amino acid, a lactam and a unit satisfying the formula (Ca diamine)·(Cb diacid), with a representing the number of carbons in the diamine and b representing the number of carbons and the diacid, where a and b are each included between 4 and 36, such as defined below.

The polyamide according to the invention can be aliphatic, cycloaliphatic, semi-aromatic or even aromatic.

The polyamide according to the invention can comprise at least one amino acid chosen from 9-aminononanoic acid, 10-aminodecanoic acid, 12-aminododecanoic acid and 11-aminoundecanoic acid and derivatives thereof in particular N-heptyl-11-aminoundecanoic acid.

The polyamide according to the invention can comprise at least one lactam chosen among pyrrolidinone, piperidinone, caprolactam, enantholactam, caprylolactam, pelargolactam, decanolactam, undecanolactam, and laurolactam.

The polyamide according to the invention can comprise at least one unit satisfying the formula (Ca diamine)·(Cb diacid).

When the (diamine in Ca) unit is an aliphatic and linear diamine with formula, $H_2N—(CH_2)_a—NH_2$, the Ca diamine is chosen from butanediamine (a=4), pentanediamine (a=5), hexanediamine (a=6), heptanediamine (a=7), octanediamine (a=8), nonanediamine (a=9), decanediamine (a=10), undecanediamine (a=11), dodecanediamine (a=12), tridecanediamine (a=13), tetradecanediamine (a=14), hexadecanediamine (a=16), octadecanediamine (a=18), octadecanediamine (a=18), eicosanediamine (a=20), docosanediamine (a=22) and diamines obtained from dimerized fatty acids.

The Ca diamine can be a branched aliphatic diamine chosen from methyl-pentane-methylene-diamine (MPMD).

When the diamine is cycloaliphatic, it is chosen from bis(3,5-dialkyl-4-aminocyclohexyl)methane, bis(3,5-dialkyl-4-aminocyclohexyl)ethane, bis(3,5-dialkyl-4-aminocyclo-hexyl)propane, bis(3,5-dialkyl-4-aminocyclo-hexyl)butane, bis-(3-methyl-4-aminocyclohexyl)-methane (BMACM or MACM), p-bis(aminocyclohexyl)-methane (PACM) and isopropylidenedi(cyclohexylamine) (PACP), cis and trans1,3-bis(aminomethyl)cyclohexane (1,3-BAC, CAS number 2579-20-6), and cis and trans1,4 bis(aminomethyl)cyclohexane (1,4-BAC, CAS number 2549-07-9).

It may also include the following carbon backbones: norbornyl methane, cyclohexylmethane, dicyclohexylpropane, di(methylcyclohexyl), di(methylcyclohexyl) propane. A non-exhaustive list of these cycloaliphatic diamines is given in the publication "Cycloaliphatic Amines" (Encyclopedia of Chemical Technology, Kirk-Othmer, 4th Edition (1992), pp. 386-405).

When the diamine is alkylaromatic, it is chosen from 1,3-xylylene diamine and 1,4-xylylene diamine and mixtures thereof.

When the monomer (diacid in Cb) is aliphatic and linear, it is chosen from succinic acid (y=4), pentanedioic acid (y=5), adipic acid (y=6), heptanedioic acid (y=7), octanedioic acid (y=8), azelaic acid (y=9), sebacic acid (y=10), undecanedioic acid (y=11), dodecanedioic acid (y=12), brassylic acid (y=13), tetradecanedioic acid (y=14), hexadecanedioic acid (y=16), octadecanoic acid (y=18), octadecenedioic acid (y=18), eicosanedioic acid (y=20), docosanedioic acid (y=22) and fatty acid dimers containing 36 carbons.

The fatty acid dimers mentioned above are dimerized fatty acids obtained by oligomerization or polymerization of monobasic unsaturated long-chain hydrocarbon fatty acids (such as linoleic acid and oleic acid), as described in particular in document EP 0,471,566.

When the diacid is cycloaliphatic, it can include the following carbon backbones: norbornylmethane, cyclohexylmethane, dicyclohexylmethane, dicyclohexylpropane, di(methylcyclohexyl), di(methylcyclohexyl)propane.

When the diacid is aromatic, it is chosen from terephthalic acid, isophthalic acid and naphthalenic diacid.

The following can be given as examples of copolyamides: caprolactam and laurolactam copolymers (PA 6/12), caprolactam, adipic acid and hexamethyl diamine copolymers (PA 6/66), caprolactam, laurolactam and adipic acid and hexamethylene diamine copolymers (PA 6/12/66), caprolactam, azaleic acid and hexamethylene diamine, 11-aminoundecanoic acid and laurolactam copolymers (PA 6/69/11/12), caprolactam, adipic acid and hexamethylene diamine, 11-aminoundecanoic acid and laurolactam (PA 6/66/11/12), as azelaic acid and hexamethylene diamine and laurolactam copolymers (PA 69/12).

Preferably, the polyamide used in the composition according to the invention is chosen from the PA6 homopolyamide resulting from polycondensation of caprolactam or aminocaproic acid, the PA11 homopolyamide resulting from polycondensation of 11-aminoundecanoic acid, the PA12 homopolyamide resulting from polycondensation of laurolactam or 12-aminododecanoic acid, the PA6.6 copolyamide resulting from polycondensation of hexamethylene diamine and adipic acid.

More specifically, the polyamide units are chosen from PA6, PA66, PA 6/66, PA46, PA6T/66, PA6T/6I/66, PA610, PA612, PA 69/12, PA 614, PA 6/12, PA11/12, PA12, PA11, PA1010, PA1012, PA618, PA10T, PA 6/12/66, PA12/10T, PA1010/10T, PA 6/6T/10T, PA 11/6T/10T, PA 12/6T/10T, PA 6/69/11/12, PA 6/66/11/12, PA11/10T, PA11/BACT, 11/BACT/6T, MXDT/10T, MPMDT/10T, BACT/6T and BACT/10T and mixtures thereof.

Polyamide mixtures can be used. Advantageously, the relative viscosity of the polyamides, measured in a 1% solution in sulfuric acid at 20° C. is included between 1.5 and 5.

The polyamide or polyamide mixture is preferably chosen sufficiently semi crystalline, meaning with the melting enthalpy greater than or equal to 25 J/g (measured by DSC).

Generally, polyamides are distinguished by the number of carbon atoms per nitrogen atom thereof, knowing that there are as many nitrogen atoms as amide groups (—CO—NH—).

In the case of a PA-X·Y homopolyamide, the number of carbon atoms per nitrogen atom is the mean of unit X and unit Y.

In the case of copolyamides, the number of carbon atoms per nitrogen atom is calculated according to the same principle. The molar ratios of the various amide units are used for the calculation.

A low carbon polyamide is a polyamide with a low level of carbon atoms (C) compared to nitrogen atoms (—NH—). These are polyamides with fewer than nine carbon atoms per nitrogen atom, such as for example polyamide-6, polyamide-6.6, polyamide-4.6, copolyamide-6.T/6.6, copolyamide 6.I/6.6, copolyamide-6.T/6.I/6.6 and the polyamide 9.T. I represents isophthalic diacid.

A high carbon polyamide is a polyamide with a high level of carbon atoms (C) compared to nitrogen atoms (—NH—). These are polyamides with at least nine carbon atoms per nitrogen atom, such as for example polyamide-9, polyamide-12, polyamide-11, polyamide-10.10 (PA10.10), copolyamide 12/10.T, copolyamide 11/10.T, polyamide-12.T and polyamide-6.12 (PA6.12). T represents terephthalic/isophthalic acid.

In the case of a PA-X·Y homopolyamide, the number of carbon atoms per nitrogen atom is the mean of unit X and unit Y. Thus PA6.12 is a PA with nine carbon atoms per nitrogen atom; in other words, it is a C9 PA. PA6.13 is C9.5. PA-12 is C10, where T, meaning terephthalic acid, is C8.

In the case of copolyamides, the number of carbon atoms per nitrogen is calculated according to same principle. The molar ratios of the various amide units are used for the calculation. Thus the coPA-6.T/6.6 60/40 molar percentage is C6.6: 60%×(6+8)/2+40%×(6+6)/2=6.6. In the case of a copolyamide having non-amide type units, the calculation is done solely on the portion of amide units. Preferably, the polyamide or polyamide mixture present in the matrix of composition forming the compartment has an average number of carbon atoms per nitrogen atom greater than or equal to 9, preferably greater than or equal to 10, and more preferably included between 9 and 18, and in particular included between 10 and 18.

The preferred polyamide present in the matrix of the composition forming the compartment is chosen among PA612, PA 69/12, PA 614, PA 6/12, PA 11/12, PA12, PA111, PA1010, PA1012, PA618, PA10T, PA12/10T, PA1010/10T, PA 11/6T/10T, PA 12/6T/10T, PA 6/69/11/12, PA11/10.T, 11/BACT, 11/BACT/6T, MXDT/10T, MPMDT/10T, BACT/6T and BACT/10T and mixtures thereof.

Preferably, the polyamide or mixture of polyamides must be usable at high service temperatures. One possible selection criterion is to preferably choose them with a melting point greater than or equal to 170° C.

In the meaning of the present invention, majority is understood to mean a portion over 50% within the matrix.

The one or more polyamides represent 20 to 80% by weight relative to the total weight of the composition.

Flame Retardant

The compartment according to the invention is made up of a composition comprising a matrix comprising at least one flame retardant.

Preferably, the flame retardant is selected from halogen-free flame retardants, such as described in US 2008/0,274,355 and in particular a metal salt chosen from a phosphinic acid metal salt, a metal salt of diphosphinic acid, a polymer containing at least one metal salt of phosphinic acid, a polymer containing at least one metal salt of diphosphinic acid. The flame retardant can also be selected from red phosphorus, antimony oxide, zinc oxide, iron oxide, magnesium oxide, metal borates, such as zinc borate, melamine pyrophosphates, melamine cyanurates, and siliconated or fluoridated type non-drip agents.

The flame retardant can also be a mixture of the aforementioned retardants.

They may also be halogenated flame-retardant agents such as a brominated or polybrominated polystyrene, a brominated polycarbonate or a brominated phenol.

Preferably, the phosphinic acid metal salt according to the invention is formula (I) below and the diphosphinic acid metal salt is formula (II) below:

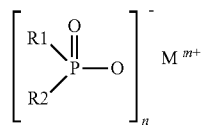

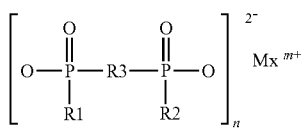

with $R_1$ and $R_2$, independently of each other, designate a linear or branched $C_1$-$C_6$ alkyl group or an aryl group;

$R_3$ represents a linear or branched $C_1$-$C_{10}$ alkylene, a $C_6$-$C_{10}$ arylene, a $C_6$-$C_{10}$ alkylarylene, or $C_6$-$C_{10}$ arylalkylene group;

M is a Mg, Ca, Al, Sb, Sn, Ge, Ti, Zn, Fe, Zr, Ce, Bi, Sr, Mn, Li, Na, K and/or a protonated amine base;

m is an integer ranging from 1 to 4;

n is an integer ranging from 1 to 4;

x is an integer ranging from 1 to 4;

where n and m are chosen such that the salt is neutral, meaning that it does not carry a net electrical charge.

Preferably, M represents a calcium, magnesium, aluminum or zinc ion.

Preferably $R_1$ and $R_2$, independent of each other, designate a methyl, ethyl, n-propyl, iso-propyl, and n-butyl, tertiary-butyl, n-pentyl and/or phenyl group.

Preferably, $R_3$ represents a methylene, ethylene, n-propylene, iso-propylene, n-butylene, tert-butylene, n-pentylene, n-octylene, n-dodecylene, phenylene, naphthalene, methylphenylene, ethylphenylene, tertiary-butylphenylene, methyl naphthalene, ethylnaphthalene, tert-butylnaphthalene, phenylmethylene, phenylethylene, phenylpropylene, or phenylbutylene group.

More specifically, the flame-retardant content present in the matrix of the composition according to the invention is included between 10 and 30% by weight, preferably 15 and 25% by weight, and more specifically between 17 and 22% by weight relative to the total weight of the polyamide(s) present in the composition.

Reinforcing Fibers

The composition according to the invention forming the battery compartment comprises from 20 to 80% by weight relative to the total weight of the composition of reinforcing fibers.

The fibers present in the composition according to the invention can have different dimensions.

The reinforcing fibers can be short, long or continuous. A mixture of these fibers of various dimensions and/or various type can also be used.

Preferably, the "short" fibers are between 200 and 400 μm long.

The long fibers have a length over 1000 μm.

These reinforcing fibers may be chosen from:

inorganic fibers, those having high melting temperatures Tm' greater than the melting temperature Tm of said polyamide present in the matrix of the composition of the compartment according to the invention and greater than the polymerization and/or implementation temperature;

polymer fibers having a melting temperature Tm' or if not the Tm', a glass transition temperature Tg', greater than the polymerization temperature or greater than the melting temperature Tm of said polyamide present in the matrix of the composition of the compartment according to the invention and greater than the implementation temperature;

natural fibers;

or mixtures of the fibers cited above;

Examples of inorganic fibers suitable for the invention are carbon fibers, which includes fibers of nanotubes or carbon nanotubes (CNT), carbon nanofibers or graphenes; silica fibers such as glass fibers, in particular type E, R or S2; boron fibers; ceramic fibers, in particular silicon carbide fibers, boron carbide fibers, boron carbonitride fibers, silicon nitride fibers, boron nitride fibers, basalt fibers; fibers or filaments containing metals and/or their alloys; metal oxide fibers, in particular of alumina ($Al_2O_3$); metalized fibers such as metalized glass fibers and metalized carbon fibers or mixtures of previously cited fibers.

The length of the glass fibers is measured according to the ISO 22314:2006(E) standard.

The following can be listed as suitable polymer fibers for the invention:

amorphous thermoplastic polymer-based fibers and have a glass transition temperature Tg greater than the Tg of the polyamide or mixture of polyamides present in the matrix when it is amorphous; or greater than the Tm of the polyamide or mixture of polyamides present in the matrix when it is semi crystalline.

Advantageously, they are semi crystalline thermoplastic polymer-based and have a melting point Tm greater than the Tg of the polyamide or polyamide mixture present in the matrix when the matrix is amorphous; or greater than Tm of the polyamide or mixture of polyamides present in the matrix when the matrix is semi crystalline. Thus, there is no melting risk for the organic fibers making up the reinforcing material during the impregnation by the thermoplastic matrix of the final composite.

the thermohardening polymer fibers and more particularly chosen from: unsaturated polyesters, epoxy resins, vinyl esters, phenol resins, polyurethanes, cyanoacrylates and polyimides, such as bis-maleimide resins, aminoplasts resulting from the reaction of an amine such as melamine with an aldehyde such as glyoxal or formaldehyde fibers of thermoplastic polymers and more particularly chosen from: polyethylene terephthalate (PET), polybutylene terephthalate (PBT), polyamide fibers, aramid fibers (such as Kevlar®) and aromatic polyamides such as those having one of the formulas: PPD.T, MPD.I, PAA and PPA, with PPD and MPD being respectively p- and m-phenylene diamine, PAA being polyarylamides and PPA being polyphthalamides, fibers of polyamide block copolymers such as polyamide/polyether, fibers of polyarylether ketones (PAEK) such as polyetherether ketone (PEEK), polyetherketone ketone (PEKK), polyetherketoneetherketone ketone (PEKEKK).

Among the fibers of natural origin, and in particular vegetable, the following can be listed: fibers based on flax, ricin, wood, kenaf, coconut, hemp, jute, lignin, bamboo, silk, in particular spider silk, sisal and other cellulose fibers, in particular viscose. These plant fibers can be used pure, treated or coated with a coating layer, in order to improve the adherence and impregnation of the polymer matrix.

The reinforcing fibers can be made up of a fibrous material which can also be a fabric, a braid or woven with fibers.

It can also correspond to fibers with maintaining yarns.

These component fibers can be used alone or in mixtures. Thus, organic fibers can be mixed with mineral fibers in order to be impregnated with the polymer matrix and to form the pre-impregnated fibrous material.

The organic fiber rovings can have several grammages. They can further have several geometries. The fibers can come in short fiber form, which then make up felts or nonwovens which can come in the form of strips, layers or pieces, or in continuous fiber form, which make up 2D fabrics, braids or rovings of unidirectional (UD) or nonwoven fibers. The component fibers of the fibrous material can further assume the form of a mixture of these reinforcing fibers with different geometries.

Preferably, the fibrous material is made up of continuous carbon, glass or silicon carbide fibers or mixtures thereof, in particular carbon fibers. It is used in the form of a roving or several rovings.

Preferred short reinforcing fibers are short fibers chosen from: carbon fibers, including metalized fibers, glass fibers, including metalized glass fibers like E, R, S2, aramid fibers (like Kevlar®) or aromatic polyamides, polyarylether ketone (PAEK) fibers, such as polyetherether ketone (PEEK), polyetherketone ketone (PEKK) fibers, polyetherketoneetherketone ketone (PEKEKK) fibers or mixtures thereof.

Preferably, the reinforcing fibers are selected from glass, carbon, ceramic and aramid fibers or mixtures thereof.

According to an embodiment of the invention, the compartment according to the invention has heat conduction properties. According to this preferred embodiment, the reinforcing fibers will be preferably chosen from carbon fibers and boron nitride fibers.

According to another embodiment of the invention, the compartment according to the invention has heat insulating properties. According to this preferred embodiment, the reinforcing fibers will be preferably chosen from glass fibers, basalt fibers and aramid fibers.

More specifically, the reinforcing fiber content in the composition according to the invention is included between 20 and 80% by weight, by weight relative to the total weight of the composition.

Depending on the size of the fibers used: short, long or continuous, the reinforcing fiber content can be different in the composition of the invention.

Thus, in the case of short-reinforcing fibers, the fiber content is preferably included between 20 and 60% by weight of reinforcing fibers.

In the case of long or continuous reinforcing fibers, the fiber content is preferably included between 60 and 80% by weight of reinforcing fibers.

Impact Modifiers

The composition according to the invention forming the battery compartment comprises from 0 to 20% by weight relative to the total weight of the composition of at least one impact modifier.

The impact modifier is advantageously constituted by a polymer having a flexural modulus below 100 MPa measured according to standard ISO 178 at 50% RH and a Tg below 0° C. measured according to standard 11357-2 of 2013.

The glass transition temperature Tg of the polyamides is measured using a differential scanning calorimeter (DSC), after a second heating pass, according to standard ISO 1 1357-2:2013. The heating and cooling rates are 20° C./min.

Preferably, the impact modifier is formed of one or more polyolefins, a part or all thereof bearing a function chosen from the carboxylic acid, carboxylic anhydride and epoxide functions. Very specifically, the polyolefin can be chosen from an elastomeric ethylene and propylene copolymer (EPR), an elastomeric ethylene-propylene-diene copolymer (EPDM) and an ethylene/alkyl (meth)acrylate copolymer.

The composition may comprise up to 50% by weight, relative to the total weight of said composition, of a semi crystalline polyolefin or a mixture of polyolefins, having a flexural modulus, measured according to the ISO 178 standard at 50% RH, over 300 MPa, advantageously over 800 MPa.

This impact modifier is a functionalized polyolefin (B1).

According to the invention, functionalized polyolefin (B1) is understood to mean the following polymers.

The functionalized polyolefin (B1) can be an alpha-olefin polymer having reactive units: the functionalities. Such reactive units are carboxylic acid, anhydride or epoxy functions.

The homopolymers or copolymers of alpha-olefins or diolefins can be given as examples, such as for example, ethylene, propylene, 1-butene, 1-octene, butadiene, and more specifically:

the homopolymers and copolymers of ethylene, particularly LDPE, HDPE, LLDPE (linear low-density polyethylene), VLDPE (very low-density polyethylene) and metallocene polyethylene;

homopolymers or copolymers of propylene;

ethylene/alpha-olefin copolymers such as ethylene/propylene, EPR (abbreviation for ethylene-propylene-rubber) and ethyl ene/propylene/diene (EPDM);

styrene/ethylene-butene/styrene (SEBS), styrene/butadiene/styrene (SBS), styrene/isoprene/styrene (SIS), styrene/ethylene-propylene/styrene (SEPS) block copolymers;

copolymers of ethylene with at least one product chosen from the salts or esters of unsaturated carboxylic acids such as alkyl (meth)acrylate (for example methyl acrylate), or the vinyl esters of saturated carboxylic acids such as vinyl acetate (EVA), where the proportion of comonomer can reach 40% by weight.

These polyolefins described above can be grafted, copolymerized or terpolymerized by reactive units (the functionalities), such as carboxylic acid, anhydride or epoxy functions.

More specifically these polyolefins are grafted or co- or ter-polymerized by unsaturated epoxides such as glycidyl (meth)acrylate, or by carboxylic acids or the corresponding salts or esters such as (meth)acrylic acid (which can be completely or partially neutralized by metals such as Zn, etc.) or by carboxylic acid anhydrides such as maleic anhydride.

The functionalized polyolefin (B1) can be chosen from the following, maleic anhydride or glycidyl methacrylate grafted, (co)polymers wherein the graft rate is for example from 0.01 to 5% by weight:
  of PE, of PP, of copolymers of ethylene with propylene, butene, hexene, or octene containing for example from 35 to 80% by weight of ethylene;
  ethylene/alpha-olefin copolymers such as ethylene/propylene, EPR (abbreviation for ethylene-propylene-rubber) and ethylene/propylene/diene (EPDM);
  styrene/ethylene-butene/styrene (SEBS), styrene/butadiene/styrene (SBS), styrene/isoprene/styrene (SIS), styrene/ethylene-propylene/styrene (SEPS) block copolymers;
  ethylene and vinyl acetate copolymers (EVA), containing up to 40% by weight of vinyl acetate;
  ethylene and alkyl (meth)acrylate copolymers, containing up to 40% by weight of alkyl (meth)acrylate;
  ethylene and vinyl acetate (EVA) and alkyl (meth)acrylate copolymers, containing up to 40% by weight of comonomers.

A functionalized polyolefin is for example a PE/EPR mixture, whose ratio by weight can vary widely, for example between 40/60 and 90/10, said mixture being co-grafted with an anhydride, in particular maleic anhydride, according to a graft rate for example of 0.01 to 5% by weight.

The functionalized polyolefin (B1) can also be chosen from ethylene/propylene copolymers with a majority of maleic anhydride grafted propylene condensed with a monoamine polyamide (or a polyamide oligomer) (products described in EP-A-0,342,066).

The functionalized polyolefin (B1) can also be a co- or terpolymer of at least the following units:
  (1) ethylene;
  (2) alkyl (meth)acrylate or saturated carboxylic acid vinyl ester; and
  (3) anhydride such as maleic or (meth)acrylic anhydride or epoxies such as glycidyl methacrylate.

As an example of functionalized polyolefins of the latter type, mention may be made of the following copolymers, where ethylene represents preferably at least 60% by weight and where the termonomer (the function) represents for example from 0.1 to 12% by weight of the copolymer:
  ethylene/alkyl (meth)acrylate/(meth)acrylic acid or maleic anhydride or glycidyl methacrylate copolymers;
  ethylene/vinyl acetate/maleic anhydride or glycidyl methacrylate copolymers;
  ethylene/vinyl acetate or alkyl (meth)acrylate/(meth)acrylic acid or maleic anhydride or glycidyl methacrylate copolymers.

In the preceding copolymers, (meth)acrylic acid can be salified with Zn or Li.

The term "alkyl (meth)acrylate" in (B1) denotes $C_1$ to $C_8$ alkyl methacrylates and acrylates, and can be chosen from methyl acrylate, ethyl acrylate, n-butyl acrylate, isobutyl acrylate, 2-ethyl-hexyl acrylate, cyclohexyl acrylate, methyl methacrylate and ethyl methacrylate.

Moreover, the previously cited polyolefins (B1) may also be crosslinked by any appropriate method or agent (diepoxy, diacid, peroxide, etc.); the term functionalized polyolefin also comprises mixtures of the previously cited polyolefins with a difunctional reagent such as a diacid, dianhydride, diepoxy, etc. that can react with these or mixtures of at least two functionalized polyolefins that can react together.

The copolymers mentioned above (B1) may be copolymerized in a statistical or sequenced way and have a linear or branched structure.

The molecular weight, MFI, and density of these polyolefins can also vary widely, which the person skilled in the art will know. MFI, abbreviation for melt flow index, is a measure of fluidity when melted. It is measured according to standard ASTM 1238.

Advantageously the functionalized polyolefins (B1) are chosen from any polymer comprising alpha-olefin units and units carrying polar reactive functions like epoxy, carboxylic acid or carboxylic acid anhydride functions. As examples of such polymers, mention may be made of terpolymers of ethylene, alkyl acrylate and maleic anhydride or glycidyl methacrylate like Lotader® from the Applicant or maleic anhydride grafted polyolefins like Orevac® from the Applicant and terpolymers of ethylene, alkyl acrylate and (meth) acrylic acid. Mention may also be made of homopolymers or copolymers of by a carboxylic acid anhydride grafted polypropylene then condensed with polyamides or polyamide monoamine oligomers, as described in the application EP 0,342,066.

More specifically, the functionalized polyolefins (B1) are:
  ethylene, alkyl acrylate and maleic anhydride terpolymers;
  ethylene, alkyl acrylate and glycidyl methacrylate terpolymers;
  maleic anhydride grafted polypropylene and polyethylene;
  maleic anhydride grafted ethylene and propylene copolymers and possibly diene monomer;
  maleic anhydride grafted ethylene and octene copolymers;
  and mixtures thereof.

The functionalized polyolefin (B1) is present with a concentration included between 0 and 20% by weight, preferably between 1 and 10% by weight relative to the total weight of the composition.

Advantageously, the composition according to the invention can comprise at least one non-functionalized polyolefin (B2).

A non-functionalized polyolefin (B2) is conventionally a homopolymer or copolymer of alpha-olefins or diolefins, such as for example, ethylene, propylene, 1-butene, 1-octene, butadiene. As examples, mention may be made of:
  the homopolymers and copolymers of polyethylene, particularly LDPE, HDPE, LLDPE (linear low-density polyethylene), VLDPE (very low density polyethylene) and metallocene polyethylene.
  homopolymers or copolymers of propylene;
  ethylene/alpha-olefin copolymers such as ethylene/propylene, EPR (abbreviation for ethylene-propylene-rubber) and ethylene/propylene/diene (EPDM);
  styrene/ethylene-butene/styrene (SEBS), styrene/butadiene/styrene (SBS), styrene/isoprene/styrene (SIS), styrene/ethylene-propylene/styrene (SEPS) block copolymers;

copolymers of ethylene with at least one product chosen from the salts or esters of unsaturated carboxylic acids such as alkyl (meth)acrylate (for example methyl acrylate), or the vinyl esters of saturated carboxylic acids such as vinyl acetate (EVA), where the proportion of comonomer can reach 40% by weight;

and mixtures thereof.

The copolymers mentioned above (B2) may be statistically or sequentially copolymerized and have a linear or branched structure.

Advantageously the non-functionalized polyolefins (B2) are chosen from homopolymers or copolymers of polypropylene and any ethylene homopolymer or ethylene copolymer and a higher alpha-olefin comonomer such as butene, hexene, octene or 4-methyl-1-pentene. PP (polypropylene), high density polyethylene, medium-density polyethylene, linear low-density polyethylene, low-density polyethylene and very low-density polyethylene can be cited as examples. These polyethylenes are known by the person skilled in the art as being products from a free-radical method, from a Ziegler catalysis method, or, more recently, from metallocene catalysis. The copolymers of ethylene and vinyl acetate (EVA) are also preferred, such as those sold under the tradename EVATANE by the Applicant.

When the composition according to the invention comprises one or more non-functionalized polyolefins, the MFI of (A) and the MFIs of (B1) and (B2) can be chosen over a large range, it is however recommended that the viscosities of (B1) and (B2) be close so as to improve the dispersion of (B1) and (B2).

The non-functionalized polyolefin present with a concentration included between 0 and 20% by weight, preferably between 1 and 10% by weight relative to the total weight of the composition.

Additives

The composition according to the invention forming the battery compartment can also comprise from 0 to 20% additives.

Preferably, the additives present in the composition forming the compartment are chosen from the thermal stabilizers, plasticizers, lubricants, organic or inorganic pigments, anti-UV, antistatic, mineral fillers and organic fillers.

This thermal stabilizer can be chosen from a copper-based stabilizer, an organic stabilizer and a mixture thereof.

The copper-based stabilizer can be made up of one or more constituents chosen from copper-based compounds such as cuprous chloride, cupric chloride, cuprous bromide, cupric bromide, cuprous iodide, cupric iodide, cuprous acetate and cupric acetate.

Halides, and acetates of other metals such as silver can be listed. These copper-based compounds are typically associated with halides of alkali metals. A well-known example is the mixture of CuI and KI, where the CuI:KI ratio is typically inclusively between 1:5 to 1:15. An example of such a stabilizer is Ciba's Polyadd P201.

More details on stabilizers containing copper are found in U.S. Pat. No. 2,705,227. More recently, copper-based stabilizers such as copper complexes such as Bruggemann's Bruggolen H3336, H3337, H3373 have appeared.

Advantageously, the copper-based stabilizer is chosen from copper halides, copper acetate, copper halides or copper acetate in mixture with at least one alkaline metal halide, and mixtures thereof, preferably mixtures of copper iodide and potassium iodide (CuI/KI).

The organic stabilizer can be chosen, without this list being restrictive, from:

phenol antioxidants, for example Ciba's Irganox 245, Irganox 1010, Irganox 1098, Ciba's Irganox MD1024, Great Lakes' Lowinox 44B25;

phosphorus-based stabilizers, such as phosphites, for example Ciba's Irgafos® 168;

a UV absorber, such as Ciba's Tinuvin 312, a HALS, as previously stated, an amine type stabilizer, such as Crompton's Naugard 445, or even a hindered amine type such as Ciba's Tinuvin 770, a polyfunctional stabilizer such as Clariant's Nylostab S-EED.

A mixture of two, or more, of these organic stabilizers can obviously be envisaged.

The quantity of thermal stabilizer(s) within the composition is preferably included between 0.05 and 5% by weight, relative to the total weight of the composition.

The additives can in particular be chosen from plasticizers, such as BBSA (N-(n-butyl) benzene sulfonamide), lubricants, for example stearic acid; organic or inorganic pigments; anti-UV; antistatic; mineral fillers, such as, for example, talc, calcium carbonate, titanium dioxide, zinc oxide and organic fillers.

Among the fillers, silica, carbon black, carbon nanotubes, titanium oxide or even glass beads can be listed.

Preferably, the additives present in the composition generally have a concentration from 0.1 to 15% by weight, preferably 1 to 15 by weight relative to the total weight of the composition.

According to a preferred embodiment, the battery compartment according to the invention is made of a composition comprising:

20 to 80% by weight relative to the total weight of the composition of reinforcing fibers;

1 to 10% by weight relative to the total weight of the composition of at least one impact modifier;

0.1 to 15% by weight relative to the total weight of the composition of additives.

where the remainder is a matrix comprising:

mostly at least one polyamide and 10 to 30% by weight relative to the total weight of the polyamide(s) present in the composition of at least one flame retardant.

According to a more preferred embodiment, the battery compartment according to the invention is made of a composition comprising:

20 to 80% by weight relative to the total weight of the composition of reinforcing fibers chosen from glass, carbon, ceramic and aramid fibers or mixtures thereof;

1 to 10% by weight relative to the total weight of the composition of at least one impact modifier;

0.1 to 15% by weight relative to the total weight of the composition of additives.

where the remainder is a matrix comprising:

mostly at least one polyamide and 10 to 30% by weight relative to the total weight of the composition of at least one flame retardant.

The battery compartment can also comprise at least two enclosures:

an inner enclosure, intended to be adapted directly to the battery;

an outer enclosure.

In the meaning of the present invention, inner means arranged against the battery.

In the meaning of the present invention, outer means intended to be in contact with ambient air, for example arranged on the road side.

The presence of one or more additional enclosures serves to give the compartment an improved protection. According to the expected properties, this additional enclosure can have a moisture barrier effect, meaning providing the seal for the battery, an improved impact resistance, or thermally insulating properties.

According to a preferred embodiment, this outer enclosure can be a moisture barrier enclosure, and in particular of EVOH, of polyolefins, such as polypropylene or polyethylene: HDPE, LDPE.

Method for Preparation of the Composition

The invention also covers a method for preparation of the composition such as defined above. According to this method, the composition can be prepared by any method which makes it possible to obtain a homogeneous mixture containing the composition according to the invention, and optionally other additives, such as molten state extrusion, compacting, or even roller mixer while considering the size of the reinforcing fibers.

Advantageously, the usual devices from the thermoplastics industry for mixing or kneading are used such as extruders, such as the double-screw type extruders, and kneaders, for example BUSS co-kneaders.

Method for Production of the Compartment

Depending on the size of the fibers, the battery compartment according to the invention can be made by various techniques.

When the fibers are short, the battery compartment according to the invention can be obtained by injection, extrusion, co-extrusion, hot compression, and multi-injection of at least one composition such as defined above.

When the fibers are long or continuous, the battery compartment according to the invention can be made by various techniques chosen from: pultrusion, filament winding, thermal compression, infusion molding, resin transfer molding (RTM), structured injection and reaction molding (S-RIM) or injection-compression molding. A specific closed mold technique is RTM or S-RIM or injection-compression. The term "resin" in RTM here identifies the composition according to the invention without the reinforcing fibers.

According to a specific embodiment, the production method may comprise:
 a step of application of the reinforcing fibers in the mold, and then
 at least one step of impregnation of said fibers by a precursor composition of the composition according to the invention.

Precursor composition of the composition according to the invention is understood to mean a composition according to the invention such as defined above, but which doesn't comprise reinforcing fibers.

Use

The invention finally covers the use of the battery compartment such as defined above for protecting the battery from outside attack.

The invention claimed is:

1. A battery compartment for electric or hybrid vehicle wherein it is made up of a composition comprising:
 20 to 80% by weight relative to the total weight of the composition of reinforcing fibers;
 0 to 20% by weight relative to the total weight of the composition of at least one impact modifier;
 0 to 20% by weight relative to the total weight of the composition of additives;
 where the remainder is a matrix comprising:
  majority of at least one polyamide and
  at least one flame retardant,
 wherein the matrix of the composition making up the compartment comprises a flame retardant content included between 10 and 30% by weight relative to the total weight of the polyamide(s) present in the composition, and
 wherein the polyamide(s) present in the matrix of composition have an average number of carbon atoms per nitrogen atom greater than or equal to 9.

2. The compartment according to claim 1, wherein the polyamide(s) present in the matrix of the composition constituting the compartment comprise(s) at least two identical or different repeating units obtained by polycondensation of monomers chosen among an amino acid, a lactam and a unit satisfying the formula (Ca diamine)·(Cb diacid), with a representing the number of carbons in the diamine and b representing the number of carbons in the diacid, where a and b are each included between 4 and 36.

3. The compartment according to claim 1, wherein the polyamide(s) present in the matrix of the composition are chosen from PA612, PA 69/12, PA 614, PA 6/12, PA 11/12, PA12, PA11, PA1010, PA1012, PA618, PA10T, PA 6/12/66, PA12/10T, PA1010/10T, PA 11/6T/10T, PA 12/6T/10T, PA 6/69/11/12, PA 6/66/11/12, PA11/10.T, PA11/BACT, 11/BACT/6T, MXDT/10T, MPMDT/10T, BACT/6T and BACT/10T and mixtures thereof.

4. The compartment according to claim 1, wherein the polyamide(s) present in the matrix of the composition forming the compartment has (have) an average number of carbon atoms per nitrogen atom greater than or equal to 10.

5. The compartment according to claim 4, wherein the polyamide(s) present in the matrix of the composition forming the compartment is (are) chosen among PA 69/12, PA 614, PA 11/12, PA12, PA11, PA1010, PA1012, PA618, PA10T, PA12/10T, PA1010/10T, PA 11/6T/10T, PA 12/6T/10T, PA 6/69/11/12, PA11/10.T, 11/BACT, 11/BACT/6T, MXDT/10T, MPMDT/10T, BACT/6T and BACT/10T and mixtures thereof.

6. The compartment according claim 1, wherein the flame retardant present in the matrix of the composition making up the compartment is chosen from a metal salt of phosphinic acid, a metal salt of diphosphinic acid, a polymer containing at least one metal salt of phosphinic acid, a polymer containing at least one metal salt of diphosphinic acid; red phosphorus, an antimony oxide, a zinc oxide, an iron oxide, a magnesium oxide, metal borates, melamine pyrophosphates, melamine cyanurates, and mixtures thereof.

7. The compartment according to claim 1, wherein the matrix of the composition making up the compartment comprises a flame retardant content included between 15 and 25% by weight relative to the total weight of the polyamide(s) present in the composition.

8. The compartment according to claim 1, wherein said reinforcing fibers are chosen from mineral fibers and polymer fibers.

9. The compartment according to claim 1, wherein said reinforcing fibers are chosen from glass, carbon, ceramic and aramid fibers or mixtures thereof.

10. The compartment according to claim 1, wherein the impact modifier present in the composition making up the compartment is chosen from the following functionalized polyolefins (B1):
 ethylene, alkyl acrylate and maleic anhydride terpolymers;
 ethylene, alkyl acrylate and glycidyl methacrylate terpolymers;

maleic anhydride grafted polypropylenes and polyethylenes;

maleic anhydride grafted ethylene and propylene copolymers and possibly diene monomer;

maleic anhydride grafted ethylene and octene copolymers;

and mixtures thereof.

11. The compartment according to claim 1, wherein the impact modifier content is included between 1 and 10% by weight relative to the total weight of the composition.

12. The compartment according to claim 1, wherein the additives present in the composition forming the compartment are chosen from thermal stabilizers; plasticizers, lubricants, organic or inorganic pigments, anti-UV; antistatic; mineral fillers and organic fillers.

13. The compartment according to claim 1, wherein the composition making up the compartment comprises an additive content included between 0.1 and 15% by weight relative to the total weight of the composition.

14. The compartment according to claim 1, wherein it comprises at least two enclosures:
    an inner enclosure made up of the composition, intended to be adapted directly to the battery; and
    an outer enclosure.

15. A process for protecting the battery from outside attack, wherein the process comprising protecting the battery with the battery compartment of claim 1.

16. The compartment according to claim 1, wherein the polyamide(s) present in the matrix of the composition forming the compartment comprises 20 to 80% by weight relative to the total weight of the composition.

* * * * *